United States Patent
Vikhagen

(10) Patent No.: US 10,466,032 B2
(45) Date of Patent: Nov. 5, 2019

(54) OPTICAL INTERFEROMETRY

(71) Applicant: OPTONOR AS, Trondheim (NO)

(72) Inventor: Eiolf Vikhagen, Trondheim (NO)

(73) Assignee: OPTONOR AS, Trondheim (NO)

( * ) Notice: Subject to any disclaimer, the term of this patent is extended or adjusted under 35 U.S.C. 154(b) by 0 days.

(21) Appl. No.: 15/776,333

(22) PCT Filed: Nov. 3, 2016

(86) PCT No.: PCT/GB2016/053425
§ 371 (c)(1),
(2) Date: May 15, 2018

(87) PCT Pub. No.: WO2017/085457
PCT Pub. Date: May 26, 2017

(65) Prior Publication Data
US 2018/0328713 A1  Nov. 15, 2018

(30) Foreign Application Priority Data
Nov. 16, 2015 (GB) .................................. 1520200.5

(51) Int. Cl.
*G01B 11/02* (2006.01)
*G01B 9/02* (2006.01)
(Continued)

(52) U.S. Cl.
CPC ..... *G01B 9/02089* (2013.01); *G01B 9/02045* (2013.01); *G01B 9/02095* (2013.01);
(Continued)

(58) Field of Classification Search
CPC ............ G01B 9/02089; G01B 9/02045; G01B 9/02095; G01B 9/02098; G01B 11/162; G01B 11/164
(Continued)

(56) References Cited

U.S. PATENT DOCUMENTS

| 3,690,159 A | 9/1972 | Kersch et al. |
| 4,591,996 A * | 5/1986 | Vachon ............... G01L 1/24 356/35.5 |

(Continued)

FOREIGN PATENT DOCUMENTS

| DE | 102005041373 A | 6/2006 |
| GB | 1261542 A | 1/1972 |

(Continued)

OTHER PUBLICATIONS

Long, Z., et al., "Investigation of Project Moir: Interferometry Technique on Measuring Model Deformation," 2013 Seventh International Conference on Image and Graphics (ICIG), Jul. 26-28, 2013, Qingdao, China, pp. 273-277.

(Continued)

*Primary Examiner* — Tarifur R Chowdhury
*Assistant Examiner* — Jonathon Cook
(74) *Attorney, Agent, or Firm* — Withrow & Terranova, P.L.L.C.; Vincent K. Gustafson

(57) ABSTRACT

An optical interferometer (1) is used to determine information about the position, gradient or motion of a surface of an object (2) at each of a plurality of points on the surface. An image is projected onto the surface of the object (2), such that, for each of the plurality of points, the intensity or spectrum of the projected image at that point depends on the determined information about the position, gradient or motion of the surface at that point.

20 Claims, 3 Drawing Sheets

(51) Int. Cl.
*G01P 3/36* (2006.01)
*G01H 9/00* (2006.01)
*G01P 15/093* (2006.01)
*G01D 5/26* (2006.01)
*G01B 11/16* (2006.01)
*G01S 17/32* (2006.01)
*G01S 17/58* (2006.01)
*G01S 17/89* (2006.01)
*G01S 7/491* (2006.01)

(52) U.S. Cl.
CPC ........ *G01B 9/02098* (2013.01); *G01B 11/162* (2013.01); *G01D 5/266* (2013.01); *G01H 9/00* (2013.01); *G01P 3/36* (2013.01); *G01P 15/093* (2013.01); *G01S 7/4917* (2013.01); *G01S 17/32* (2013.01); *G01S 17/58* (2013.01); *G01S 17/89* (2013.01)

(58) Field of Classification Search
USPC ........................................................ 356/498
See application file for complete search history.

(56) References Cited

U.S. PATENT DOCUMENTS

| | | | | |
|---|---|---|---|---|
| 4,620,223 | A | | 10/1986 | Haskell et al. |
| 4,682,892 | A | * | 7/1987 | Chawla ................ G01B 11/162 356/35.5 |
| 5,094,528 | A | | 3/1992 | Tyson, II et al. |
| 5,414,512 | A | * | 5/1995 | Grant .................... G01B 9/025 356/35.5 |
| 5,467,184 | A | | 11/1995 | Tenjimbayashi |
| 6,040,900 | A | * | 3/2000 | Chen ................. G01B 9/02095 356/35.5 |
| 6,188,482 | B1 | * | 2/2001 | Cloud ................. G01B 9/0201 356/491 |
| 2003/0037616 | A1 | * | 2/2003 | Vikhagen ........... G01B 11/2441 73/643 |
| 2006/0132803 | A1 | | 6/2006 | Clair et al. |
| 2007/0121121 | A1 | * | 5/2007 | Wilhelm ................ G01B 9/023 356/511 |
| 2008/0165341 | A1 | | 7/2008 | Dillon et al. |
| 2011/0019155 | A1 | | 1/2011 | Daniel et al. |
| 2012/0057174 | A1 | | 3/2012 | Briggs |
| 2013/0141712 | A1 | * | 6/2013 | Blain ................... G01B 11/162 356/34 |
| 2015/0308887 | A1 | * | 10/2015 | Vikhagen ................ G01J 9/02 73/655 |

FOREIGN PATENT DOCUMENTS

| | | |
|---|---|---|
| JP | 2006118989 A | 5/2006 |
| JP | 2006258438 A | 9/2006 |
| WO | 2006001712 A2 | 1/2006 |
| WO | 2014088424 A1 | 6/2014 |

OTHER PUBLICATIONS

OPTONOR AS, "MicroMap 5010 Brochure," Accessed on Jul. 30, 2015, 13 pages.
OPTONOR AS, "VibroMap 1000 Brochure," Accessed on Jul. 30, 2015, 2 pages.
Samset, E., et al., "Augmented Reality in Surgical Procedures," Proceedings of SPIE—The International Society for Optical Engineering, vol. 6806, Mar. 2008, 12 pages.
Search Report for United Kingdom Patent Application No. 15202005, dated Mar. 22, 2017, 3 pages.
International Search Report and Written Opinion for International Patent Application No. PCT/GB2016/053425, dated Feb. 10, 2017, 14 pages.
Communication under Rule 71(3) EPC (Intention to Grant) for European Patent Application No. 16793993.3, dated Mar. 19, 2019, 47 pages.

* cited by examiner

OPTICAL INTERFEROMETRY

This application is a 35 U.S.C. § 371 national phase filing of International Application No. PCT/GB2016/053425 filed on Nov. 3, 2016, and claims the benefit of United Kingdom Patent Application No. 1520200.5 filed on Nov. 16, 2015, wherein the disclosures of the foregoing applications are hereby incorporated by reference herein in their respective entireties.

This invention relates to optical interferometry.

It is known to use non-contact laser interferometry for non-destructive testing and vibration analysis of objects, such as machine parts. Two such techniques are TV holography and electronic shearography.

Television (TV) holography—also known as electronic speckle pattern interferometry (ESPI) or digital speckle pattern interferometry (DSPI)—uses an electronic image sensor to record successive frames of an interference pattern created by (i) a reference beam from a coherent light source like a laser and (ii) coherent light that has been scattered by an object, which may be vibrating or otherwise changing shape. Each frame is then digitally processed, separately or in combination with other frames, to generate data representing a pattern containing information relating to displacement of the object. Algorithms such as phase-unwrapping algorithms can be used to determine how much different points on the surface of the object have moved from one frame to the next, or how much the object vibrates, if time averaging techniques are used. The object may be subjected to a deflection force or it may be excited by some external means—e.g. by being struck, or by being connected to a vibration-generating unit.

Electronic shearography—also known as electronic speckle shear interferometry—is a related technique, but instead of using a reference beam, it generates an interference pattern between light scattered by the object and a spatially-shifted copy of this scattered light. A shearography system typically uses a Michelson interferometer. Because it does not require precise alignment of a reference beam, this instrumentation can be more robust to external vibrations. In addition, shearography is not sensitive to "piston" type of movements, which also makes it more robust to external vibrations. Shearography yields spatial gradient information across the surface of the object, rather than the displacement information obtained using TV holography.

Both techniques allow a full field area of the object under investigation to be measured at once. This allows a full-frame image or animated sequence of images to be presented to a human operator on a computer monitor, so that the behaviour of the object when it is deflected or vibrated can be seen by the operator. Such analysis can enable possible defects to be identified in or beneath the surface of the object, such as micro-fractures in a turbine blade or de-bonds in a composite material, before the object reaches a point of failure.

The applicant has realised, however, that such an approach can be improved upon.

Thus, from a first aspect, the invention provides a method comprising:
  using optical interferometry to determine information about the position, gradient or motion of a surface of an object at each of a plurality of points on the surface; and
  projecting an image onto the surface of the object, wherein, for each of the plurality of points, the intensity or spectrum of the projected image at that point depends on the determined information about the position, gradient or motion of the surface at that point.

From a second aspect, the invention provides a system comprising:
  optical interferometry means;
  projection means; and
  processing means configured (i) to determine, from an output of the optical interferometry means, information about the position, gradient or motion of a surface of an object at each of a plurality of points on the surface, and (ii) to cause the projection means to project an image onto the surface of the object such that, for each of the plurality of points, the intensity or spectrum of the projected image at that point depends on the determined information about the position, gradient or motion of the surface at that point.

It will be seen by those skilled in the art that, in accordance with the invention, results from the optical interferometric analysis can be overlaid on the object itself, allowing a human operator to see exactly where on the object a particular point of interest lies. This can allow the operator to mark the object (e.g., with a pen), or to alter the object (e.g., with a knife), at the appropriate point, without the uncertainty that can occur when looking at a representation of the object on a separate computer monitor. If the projecting is carried out simultaneously with the analysis—i.e. real-time—this can allow a human operator to interact with the object (e.g., adding a dampening block) and receive immediate feedback from the action, projected onto the object itself, without having to look away.

A further advantage of embodiments of the present invention can be appreciated when an optical interferometry technique is used that yields information about the gradient and/or motion of the surface, but not directly about the position of the surface. Generating a three-dimensional model of the object, for rendering on a separate display monitor, may be difficult or impossible in such situations. This difficulty is overcome, however, by embodiments of the present invention, in which an image, generated from the gradient and/or motion, is projected directly onto the object, such that the object itself, by its shape in space, inherently supplies position information to a human operator. This advantage is particularly strong when using co-axial projection, as explained in more detail below, since this allows parallax discrepancies between the interferometry analysis data and the projection image to be minimised or eliminated.

The optical interferometry used preferably does not require the optical interferometry means to contact the object. It preferably uses an electronic imaging sensor, such as a CCD or CMOS sensor, to measure light from the object in two dimensions. It may comprise one or more of TV holography, electronic shearography, scanning laser Doppler vibrometry, or any other appropriate technique. It is preferably full-field, rather than scanning-based. The optical interferometry means—or optical interferometry subsystem or optical interferometer—may comprise one or more coherent light sources, such as one or more lasers. Coherent light is preferably directed towards the object. The optical interferometry means preferably comprises a two-dimensional imaging sensor. The imaging sensor preferably receives reflected light from the object. It may also receive light from a reference beam. The optical interferometry means preferably comprises at least one lens. The lens is preferably arranged to focus light from the object onto the imaging sensor.

The projection means, or projector, preferably comprises a two-dimensional output array, such as an LCD or DLP array. It preferably comprises a lamp. It may comprise one or more lenses. It may be arranged to project a series of images—e.g. at a rate of 24 or more frames per second. The image may be projected using coherent light (e.g., from a laser projector), but it is preferably projected using incoherent light.

The image may be any pattern or picture. At its simplest, it may consist of two or more spots of light—e.g. from a laser projector—with a respective spot illuminating each of the plurality of points. However, the image is preferably formed from an array of pixels (some of which may be blank at times). The array is preferably a two-dimensional. The pixels are preferably regularly spaced in an image plane (which may be an imaginary plane, since the surface of the object will typically not be planar). Each pixel may be rectangular, circular, or any other appropriate shape, again in a real or imaginary image plane. There are preferably at least ten or a hundred pixels, and more preferably at least a thousand or more. In some embodiments, there may be more than a million pixels.

The projection means may project a number of pixels exactly equal to the number of points in the plurality of points, with the intensity and/or spectrum of each pixel depending on the determined information about the position, gradient or motion of the surface at a point on the object that the pixel is illuminating. However, this is not essential, and the projection means may project more pixels than this.

The projection means preferably has a projection axis which is co-axial with a viewing axis of the optical interferometry means. In a preferred set of embodiments, the system comprises a light-directing component arranged so that light travelling from the object to the optical interferometry means travels via the light-directing component and so that light travelling from the projection means to the object travels via the light-directing component. The light-directing component may be part of the projection means, or part of the interferometry means, or a separate component of the system. It may be arranged so that at least one ray of light travelling from the object to the optical interferometry means follows an identical path to at least one ray of light travelling from the projections means to the object. This path preferably extends between the light-directing component and the object. There may be many such common paths, extending to different respective points on the object.

The light-directing component may be arranged to allow some light to pass through the light-directing means along a straight path, while diverting other light along a different path. It may be or comprise a beam splitter, or a mirror with a centre hole. It may comprise one or more lenses or other optical elements.

Such use of a light-directing component enables accurate alignment of the projected image with the points on the object, even when the surface of the object is uneven. By aligning the axes of the interferometry means and the projection means, accurate alignment of the projected image with the points on the object can be achieved without requiring any complex transformation calculations. By contrast, achieving accurate alignment using off-axis projection (where light from the projection means arrives at the object from a quite different direction to the light travelling from the object to the optical interferometry means) can be difficult or impossible if the surface is heavily contoured.

Preferably, the system comprises an objective lens arranged to focus reflected light travelling away from the object and which is arranged to focus light travelling from the projector towards the object. By providing a common objective lens for both light paths, particularly accurate alignment of the projected image with the points on the object to which it relates can be achieved. The objective lens may be part of the projection means, or part of the interferometry means, or a separate component of the system.

The optical interferometry means and the projecting means may be contained in a common housing, although this is not essential. A light-diverting component and/or common objective lens may also be in the common housing. The use of a common housing may help to ensure accurate alignment between the projected image and the plurality of points.

The processing means, or subsystem, may take any suitable form. It may comprise one or more processors, FPGAs, ASICs, DSPs. It may comprise volatile and/or non-volatile memory. It may be in one unit or it may be distributed—e.g., over a network. It may comprise hardware and/or software.

In some embodiments, information about any two or more of position, gradient and motion of the surface are determined. Information about the position of the surface at a point may comprise information about the position of the point relative to a reference position or relative to an earlier position—for example, the distance away from the reference position or earlier position, in any direction or along a particular axis, such as along a viewing axis of the optical interferometry means, or in a plane perpendicular to such an axis. Information about the gradient of the surface may be obtained by calculating derivatives from position information, but is preferably determined directly from the optical interferometry—e.g., as when using shearography. The gradient information preferably relates to spatial gradients of a static or dynamic displacement of the object. Information about the motion of the surface may comprise a measure of speed or velocity, or a direction of movement, or an acceleration, or vibration amplitude, or vibration phase, or averaged spatial vibration gradient, etc. It will be appreciated that these examples of information that may be determined are not exhaustive. The information is preferably quantitative. The information may be averaged or smoothed, or processed in any other appropriate manner. It may be stored in an electronic memory in the processing means. It may comprise discrete information—e.g. one or more respective values for each of the plurality of points—or it may be continuous—e.g. an equation of a best-fit surface. Information about the position, gradient and motion of the surface may be determined for more points than the aforesaid plurality of points.

The plurality of points on the surface are preferably such that, if viewed through a plane (real or imaginary), they would be spaced at regular intervals over a two dimensional grid in the plane. There are preferably at least ten or a hundred points, and more preferably at least a thousand or more. The skilled person will appreciate that the points of the plurality of points may be true points (i.e., having zero dimension), or they may be regions or spots—e.g. having a size related to a resolution limit of the interferometry means. The information relating to a point may be measured directly or may be calculated—e.g., being interpolated or derived from other measurement data.

The intensity or spectrum of the light may depend on the information relating to the position, gradient or motion of the surface according to a predetermined mapping. For example, points that have moved towards the optical interferometry means, compared with a reference position, may be illuminated more brightly, while points that have moved away from the optical interferometry means, compared with a reference position, may be illuminated more darkly. Intensity and/or colour can be used in any appropriate way to indicate position, movement or shape. Static deflection images, vibration amplitude images, vibration phase images, animated vibration images, averaged spatial vibration gradient images and other images resulting from the optical measurement may be projected onto the object.

The method may be a method of analysing or surveying an object. It may be a method of non-destructive testing of an object, or vibration analysis, or static deflection analysis. The system may be an analysis or survey system; it may be a non-destructive testing system or a vibration analysis system, or a static deflection analysis system. The system may comprise means for exciting or deforming the object—e.g., by thermal loading, single frequency vibration, white noise vibration, vacuum loading, pressure loading or mechanical loading. Typical defects that may be detected are delaminations and debonds, flaws or impact damage.

The object may be of any appropriate size or type. It may, for instance, be a blade from a wind turbine, or a car door, or a loudspeaker cone. The object may comprise multiple components, onto which the image, or separate respective images, may be projected. A plurality of objects may be analysed and/or have the image projected onto them. Two or more objects may be located at different distances from the optical interferometry means, since TV holography and shearography typically have long depths of focus. The projection mean may also have the same long depth of focus.

The surface of the object may be continuous or discontinuous. It may be curved, bent or shaped in any way. The object may comprise a plurality of surfaces, some or all of which may be analysed and/or projected onto.

The projecting may occur simultaneously with a determining of further information about the position, gradient or motion of the surface of the object. This is particularly relevant when live, or real-time, video data is projected, where the results of the determining step may be projected while data is being collected and analysed for the next frame, or for a few frames ahead. The optical interferometry means may comprise a narrowband filter, like an interference filter. This can help to prevent light from the projection means interfering with the interferometry measurements. Conversely, a human operator may need to wear laser protection goggles to filter out the laser light, in order to see the projected image on the object better.

Information about the position, gradient or motion of the surface may be stored. An operator may be able to toggle the projection between different stored data, or between stored data and live data. This may be useful in order to allow the operator to evaluate and document the development of any damage. Defects in an object can be marked directly on the structure under evaluation. In some embodiments, the method comprises a step of a human operator viewing the projected image and marking the surface of the object based on information in the projected image. For instance, the operator may draw the limits of a defect directly onto the object surface with a pen, by looking at the projected image. Recorded data is preferably stored for later use or for documentation.

In some embodiments, output from the optical interferometry unit is used to align the projected image with the surface of the object. Output from the optical interferometry unit may be processed to create a generated image of the object. This image can then be used to ensure that overlaid result data images are projected one-to-one on the object surface. If, for example, the object has details on the surface which are easily identified within an image, like holes, screws, edges and so on, this adjustment can be done more easily. The generated image may be projected onto the surface of the object. A projection adjustment may then be done manually by an operator. Alternatively, the processing system may perform an alignment operation by comparing the generated image with data from a camera—for instance, using an image correlation technique. Adjustments may be made physically—e.g., by mechanically moving a lens in the projection means—or electronically—e.g., by digitally translating the image to be output by the projection means.

Features of any aspect or embodiment described herein may, wherever appropriate, be applied to any other aspect or embodiment described herein. Where reference is made to different embodiments or sets of embodiments, it should be understood that these are not necessarily distinct but may overlap.

Certain preferred embodiments of the invention will now be described, by way of example only, with reference to the accompanying drawings, in which.

Figure 1:
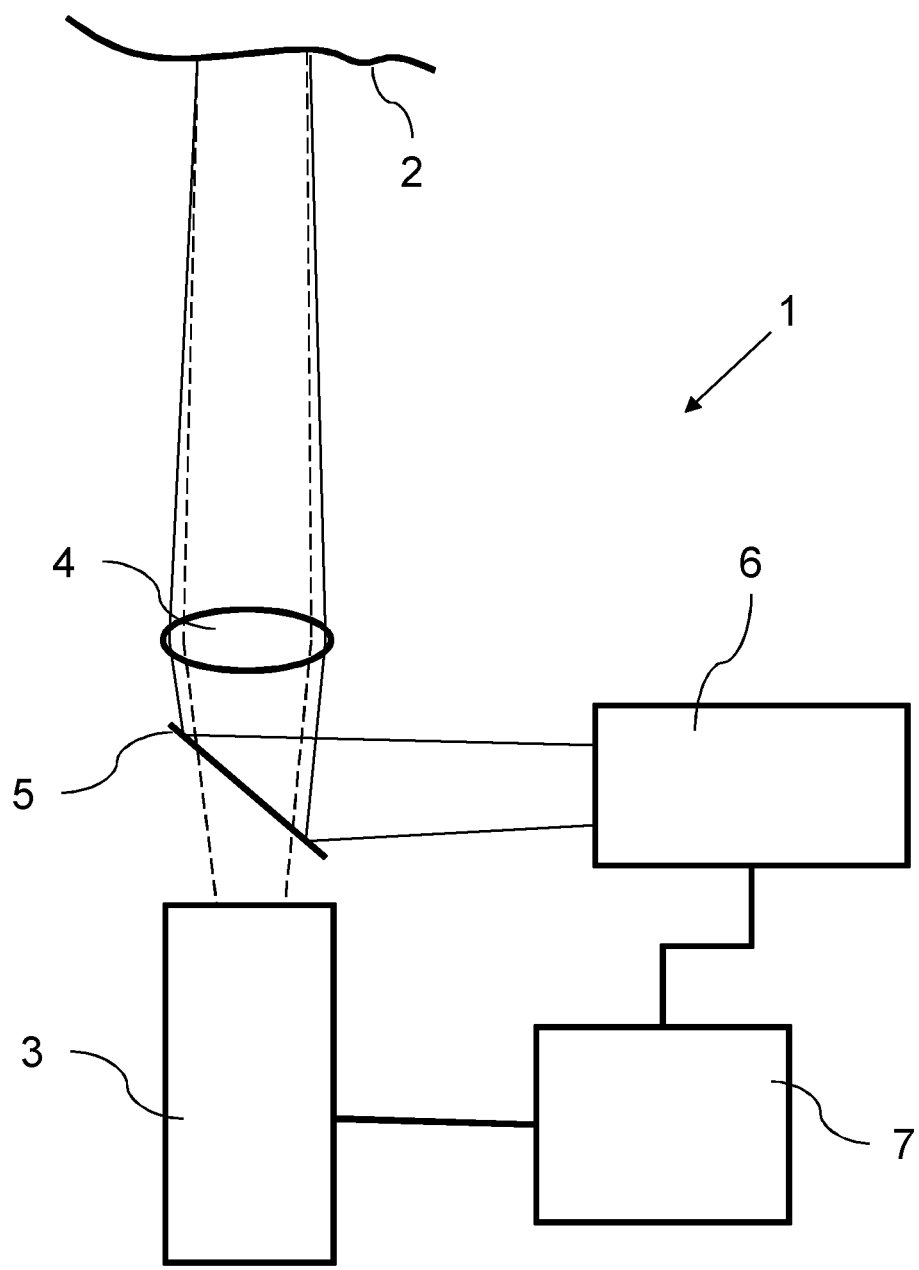
FIG. 1 is a schematic view of a first embodiment having a wholly-integrated projector system.

FIG. 1 shows an interferometric analysis system 1 for analysing an object 2. The system 1 has an interferometric analysis unit 3 which is arranged to receive laser light reflected by the object 2. The source of the laser light may be integrated in the interferometric analysis unit 3 or it may be a separate component (not shown). Exemplary beams of reflected laser light from the object 2 to the interferometric analysis unit 3 are represented by dashed lines in FIG. 1. After leaving the object these pass first through an objective lens 4 and then straight through a beam splitter 5. Alternatively, a mirror with a centre hole may be used in place of the beam splitter 5, with the reflected laser light passing through the centre hole to the interferometric analysis unit 3.

The system 1 also has an image projector 6, arranged to project light onto the object 2 via the beam splitter 5. Exemplary beams of projected light are represented in FIG. 1 by solid lines emanating from the image projector 6. After being deflected by the beam splitter 5 (or by an angled mirror with a centre hole in alternative embodiments) the light from the image projector 6 passes through the same objective lens 4 and is focussed onto the surface of the object 3.

The system also comprises a processing unit 7, which has data connections to the interferometric analysis unit 3 and to the image projector 6.

Some or all of these components of the system 1 may all be contained in a common housing (not shown). In some embodiments the processing unit 7 may be remote from the other components—e.g. a network server located in a different room or building.

In use, part or all of the object 2 is illuminated by a broad laser beam. Light that is scattered from the surface of the object 2 is collected by the objective lens 4 and received by the interferometric analysis unit 3. This interferometric analysis unit 3 may also receive a reference laser beam and operate in conjunction with the processing unit 7 to perform a TV holography analysis on the object 2. Alternatively, the interferometric analysis unit 3 and the processing unit 7 may perform a shearography analysis of the object 2, or some other interferometric analysis. The processing unit 7 may generate a still image or moving images based on the results of the analysis. Each image or frame may use colour and/or brightness to represent one or more of the position, surface gradient, speed, direction of movement at different points on the object 2. The processing unit 7 sends instructions to the image projector 6 to project the still or moving image. The projector 6 focuses light towards the beam splitter 5, which directs it through the objective lens 4 and onto the object 2. The components of the system 1 are arranged so that the projected image is scaled and aligned one-to-one with the object itself, such that each projected pixel illuminates a point on the object 2 to which it relates. It will be appreciated that, in practice, the alignment and/or scaling may not always be perfect, but it should be approximately one-to-one (e.g. such that each pixel relates to a point no more than two, three, ten or a hundred pixels away).

Figure 2:
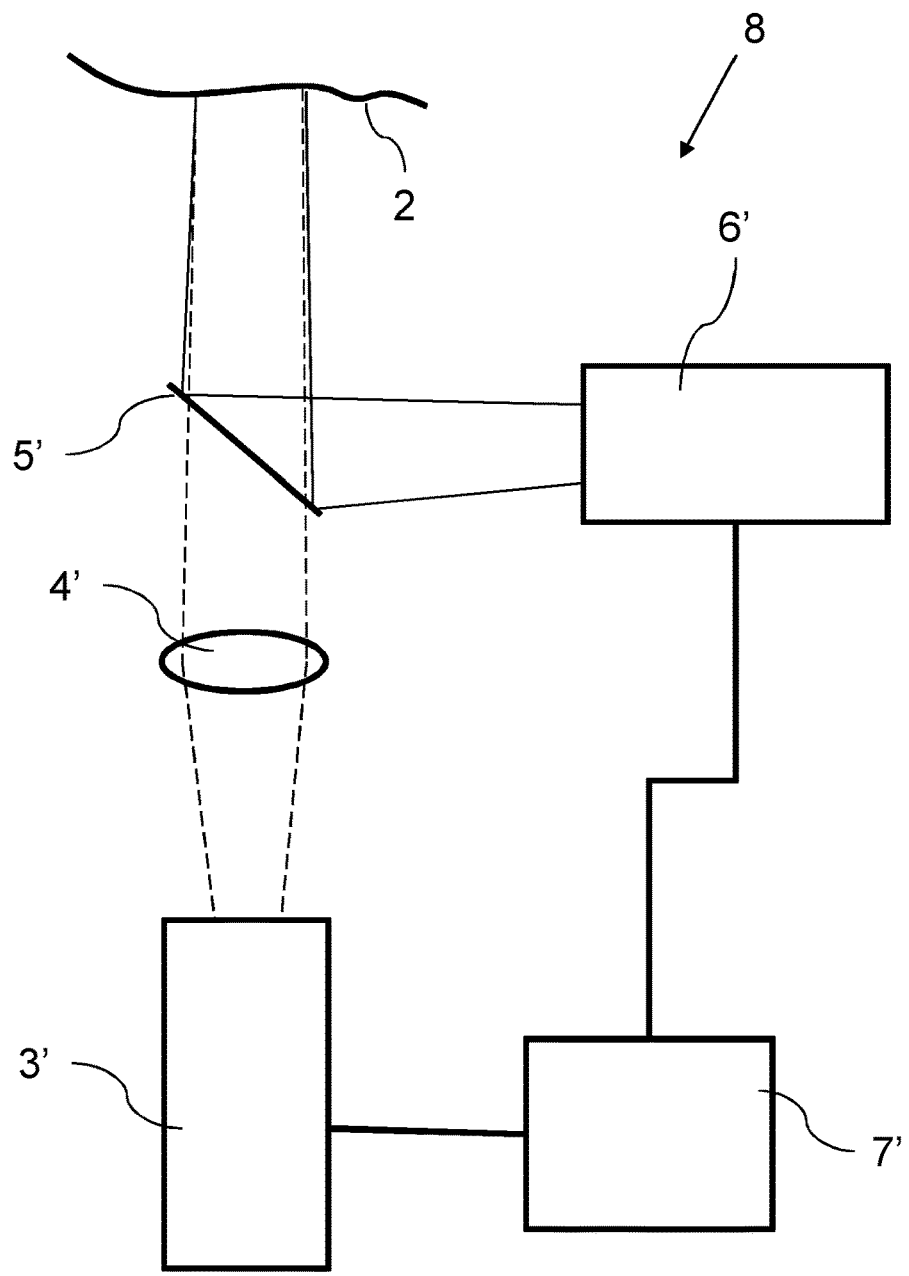
FIG. 2 is a schematic view of an alternative embodiment having a partly-integrated projector system.

FIG. 2 shows an alternative system 8 for analysing the object 2. It also has an interferometric analysis unit 3', an objective lens 4', a beam splitter 5', an image projector 6' and a processing unit 7'. However, in this system 8 the beam splitter 5' is situated closer to the object 2 than the objective lens 4', and light from the image projector 6' does not pass through the objective lens 4'. Instead, the projector 6' is focussed using only its internal lenses. In other respects, the system 8 operates in the same way as the system 1 of FIG. 1. However, because the image projector 6' does not use the same objective lens 4' as the interferometric analysis unit 3', it can be more difficult to achieve an accurate one-to-one mapping of the projected image onto the object 2, especially if the system 8 is subject to disturbances such as vibrations.

In other embodiments (not shown), it's possible that there is no beam splitter and the image projector directs light directly to the object along a different axis from the axis of the interferometric analysis unit. However, achieving accurate alignment of the projected image will typically be difficult.

Figure 3:
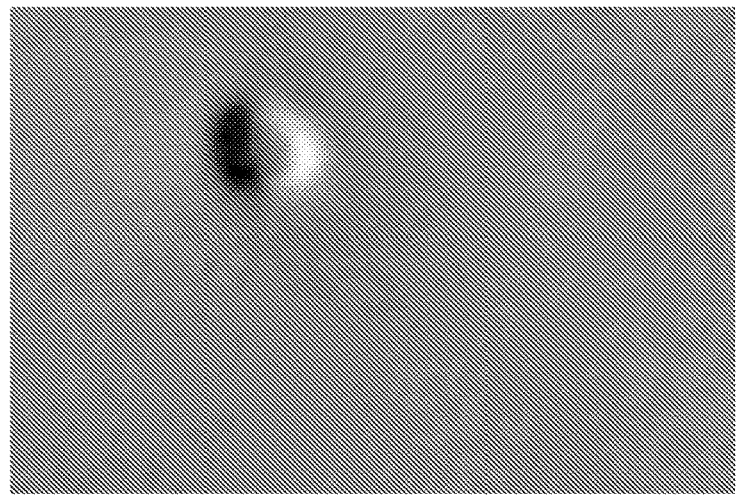
FIG. 3 is an example output image from a shearography analysis of an object undergoing static deflection.

FIG. 3 shows an example of a still image which may be projected onto the surface of the object 2 by one of the systems 1, 8 described above, when the interferometric analysis unit 3, 3' is arranged to perform shearography. The image may be generated by first analysing the object 2 with it in a relaxed state, then analysing it under a static deflection, and subtracting one from the other to obtain information about the spatial gradient across a surface of the object 2. In this example, the processing unit 7, 7' sends a greyscale image to the image projector 6, 6', in which pixel intensity represents spatial gradient. A defect, which may be a sub-surface delamination, is readily apparent. Because the image is aligned on the object 2, an engineer can easily use a pen to circle the spot on the object 2, for further investigation.

Figure 4:
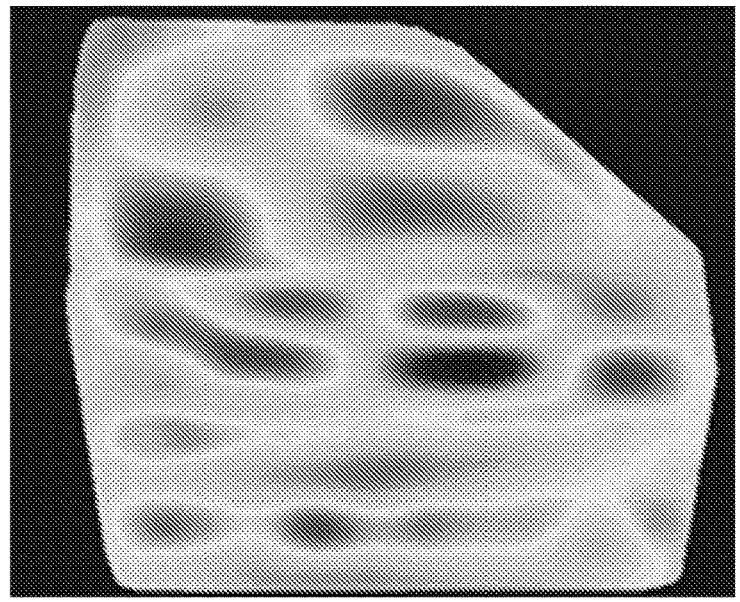
FIG. 4 is an example output frame from a TV holography analysis of a vibrating car door.

FIG. 4 shows a frame from a real-time video projection of a car door which is being vibrated by an excitation device which has been temporarily attached to the door. In this example, it has been obtained using TV holography. The video is in colour, with different colours representing different degrees of displacement away from a starting position. Because the video is projected onto the car door itself, a human designer can easily see how different elements of the door move under vibration, which may provide indications as to where additional strengthening may be required, for example. The projection may occur in real-time (i.e., while the door is being vibrated), or it may occur later, after an earlier analysis phase is complete.

It will be appreciated by those skilled in the art that the invention has been illustrated by describing one or more specific embodiments thereof, but is not limited to these embodiments; many variations and modifications are possible, within the scope of the accompanying claims.

The invention claimed is:

1. A method comprising:
   vibrating or deforming an object;
   while vibrating or deforming the object, using television (TV) holography or electronic shearography to determine information about position, gradient or motion of a surface of the object, arising from said vibrating or deforming of the object, at each point of a plurality of points on the surface; and
   projecting an image onto the surface of the object, wherein, for each point of the plurality of points, an intensity or spectrum of the projected image at that point depends on the determined information about the position, gradient, or motion of the surface at that point, arising from said vibrating or deforming of the object, and wherein the projected image provides information for identifying a sub-surface defect in the object.

2. The method of claim 1, wherein the TV holography or electronic shearography is performed with an optical interferometry system, and the projecting of the image comprises projecting the image along a projection axis that is co-axial with a viewing axis for the optical interferometry system.

3. The method of claim 1, wherein the TV holography or electronic shearography is performed with an optical interferometry system, wherein the image is projected from a projector, and wherein light travelling from the object to the optical interferometry system travels via a light-directing component, and light travelling from the projector to the object travels via the light-directing component.

4. The method of claim 3, wherein the light-directing component comprises a beam splitter.

5. The method of claim 1, wherein the image is projected from a projector, the method further comprising focusing reflected light travelling away from the object through an objective lens, and focusing light travelling from the projector towards the object through the same objective lens.

6. The method of claim 1, comprising determining further information about the position, gradient or motion of the surface of the object, arising from said vibrating or deforming of the object, at the same time as projecting said image onto the surface of the object.

7. The method of claim 1, comprising a human operator viewing the projected image and marking the surface of the object based on information in the projected image.

8. The method of claim 1, wherein vibrating or deforming the object comprises one or more of the following: applying thermal loading to the object; applying vacuum loading to the object; applying pressure loading to the object; applying mechanical loading to the object; vibrating the object at a single frequency; and vibrating the object using white noise.

9. The method of claim 1, further comprising using electronic shearography to determine a spatial gradient of a static or dynamic displacement of the object.

10. The method of claim 1, further comprising using said information about position, gradient, or motion of the surface to identify a defect beneath the surface of the object.

11. A system comprising:
   an optical interferometry subsystem configured to perform television (TV) holography or electronic shearography;
   a projector; and
   a processing subsystem configured (i) to determine, from an output of the optical interferometry subsystem, information about position, gradient, or motion of a surface of an object, arising from a vibrating or deforming of the object, at each point of a plurality of points on the surface, and (ii) to cause the projector to project an image onto the surface of the object such that, for each of the plurality of points, an intensity or spectrum of the projected image at that point depends on the determined information about the position, gradient, or motion of the surface at that point, arising from said vibrating or deforming of the object, wherein the projected image provides information for identifying a sub-surface defect in the object.

12. The system of claim 11, wherein the projector has a projection axis that is co-axial with a viewing axis of the optical interferometry subsystem.

13. The system of claim 11, comprising a light-directing component arranged so that light travelling from the object to the optical interferometry subsystem travels via the light-directing component, and light travelling from the projector to the object travels via the light-directing component.

14. The system of claim 13, wherein the light-directing component comprises a beam splitter.

15. The system of claim 11, comprising an objective lens arranged to focus reflected light travelling away from the object, and to focus light travelling from the projector towards the object.

16. The system of claim 11, wherein the processing subsystem is arranged to determine further information about the position, gradient, or motion of the surface of the object, arising from said vibrating or deforming of the object, while said image is being projected onto the surface of the object.

17. The system of claim 11, comprising means for vibrating or deforming the object.

18. The system of claim 11, wherein the optical interferometry subsystem and the projector are contained in a single housing.

19. The system of claim 11, wherein said information about position, gradient, or motion of the surface at each point of the plurality of points on the surface comprises one or more of the following: a respective speed or velocity; a respective direction of movement; a respective acceleration; a respective vibration amplitude; a respective vibration phase; and a respective averaged spatial vibration gradient.

20. The system of claim 11, further comprising an excitation device configured to be attached to the object and configured to vibrate the object.

* * * * *